United States Patent [19]

Fukushima et al.

[11] 4,435,350

[45] Mar. 6, 1984

[54] METHOD FOR THE ORIENTATION OF THERMOPLASTIC POLYETHER ETHER KETONE FILMS

[75] Inventors: Nobuo Fukushima; Teruo Saitou, both of Shiga; Haruo Hayashida, Osaka, all of Japan

[73] Assignee: Sumitomo Chemical Co., Ltd., Osaka, Japan

[21] Appl. No.: 349,940

[22] Filed: Feb. 18, 1982

[30] Foreign Application Priority Data

Feb. 19, 1981 [JP] Japan .................................. 56-23706

[51] Int. Cl.$^3$ ............................................ B29C 17/02
[52] U.S. Cl. .................. 264/280; 264/331.21; 528/125
[58] Field of Search ................ 528/125; 264/280, 284, 264/288.4, 291, 175, 331.18, 331.21

[56] References Cited

U.S. PATENT DOCUMENTS

| | | | |
|---|---|---|---|
| 2,177,659 | 10/1939 | Kimble | 264/280 |
| 4,120,931 | 10/1978 | Fukushima | 264/280 |
| 4,176,222 | 11/1979 | Cinderey | 528/125 |
| 4,320,224 | 3/1982 | Rose | 528/125 |
| 4,331,798 | 5/1982 | Staniland | 528/125 |

*Primary Examiner*—James B. Lowe
*Attorney, Agent, or Firm*—Sughrue, Mion, Zinn, Macpeak & Seas

[57] ABSTRACT

A method for the orientation of a thermoplastic polyether ether ketone film or sheet is described, which comprises rolling the thermoplastic polyether ether ketone film or sheet containing therein a repeating unit represented by the formula:

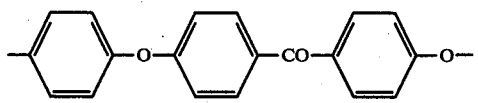

singly or in combination with one or more different repeating units at a linear pressure of at least 100 kg/cm by the use of at least one pair of pressure rolls maintained within a temperature range of from 80° C. to 320° C. while applying a backward tension of at least 80 kg/cm$^2$.

1 Claim, No Drawings

METHOD FOR THE ORIENTATION OF THERMOPLASTIC POLYETHER ETHER KETONE FILMS

FIELD OF THE INVENTION

The present invention relates to a method for the orientation of thermoplastic polyether ether ketone films. The term "films" as used herein refers to both films and sheets.

BACKGROUND OF THE INVENTION

In general, thermoplastic resins containing an aromatic ring or rings in a main chain thereof, e.g., polyether ether ketone, have rigid molecular chains and good heat resistance. They are, therefore, expected to find wide use in applications where high heat resistance is required, e.g., an electrically insulating film for a motor, an electrically insulating film for a transformer, an electrically insulating film for a condenser, and a flexible print circuit substrate. In these applications, good mechanical strength is also required. For example, an electrically insulating film for a motor is required to have a tensile strength of about 1,500 kg/cm$^2$ in the taping thereof, and films having a tensile strength of less than 1,000 kg/cm$^2$ are not suitable for practical use since they suffer from various problems and their other mechanical characteristics are also poor.

These defects in mechanical characteristics can be improved by orientating them by application of mechanical deformation.

As has been well known in the art, orientation of thermoplastic films is typically performed by stretching. Stretching of thermoplastic polyether ether ketone films, however, must be performed at very high temperatures and furthermore, severe temperature is needed. Even under such controlled temperature conditions, it is difficult to perform the stretching continuously and stably because the stretching properties are still poor, and film-cutting readily occurs even though the stretching can be performed. Thus, it has been believed that it is difficult to produce thermoplastic polyether ether ketone films having high mechanical strength on an industrial scale.

SUMMARY OF THE INVENTION

As a result of extensive investigations to develop a method for continuous and stable orientation of a thermoplastic polyether ether ketone film to improve the mechanical properties thereof and permit production of a film having high mechanical strength on an industrial scale, it has been found that the continuous and stable orientation can be performed by rolling the film at a linear pressure of at least 100 kg/cm by the use of a pair of pressure rolls maintained within a temperature range of from 80° C. to 320° C. while applying thereto a backward tension of at least 80 kg/cm$^2$.

The present invention, therefore, provides a method for the orientation of a film of a crystalline thermoplastic polyether ether ketone containing therein a repeating unit represented by the formula:

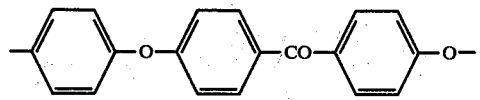

singly or in combination with other repeating units, which comprises rolling the crystalline thermoplastic polyether ether ketone film at a linear pressure of at least 100 kg/cm by the use of a pair of pressure rolls maintained within a temperature range of from 80° C. to 320° C. while applying a backward tension of at least 80 kg/cm$^2$.

DETAILED DESCRIPTION OF THE INVENTION

The thermoplastic polyether ether ketone as used herein contains therein the repeating unit represented by the formula:

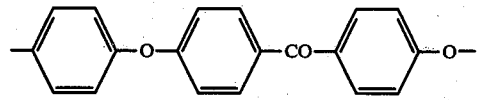

singly or in combination with other repeating units. For the purpose of improving the fluidity in extrusion processing, for example, heat resistant resins, such as polyarylene polyether polysulfone, polyarylate, polyester, nylon and polycarbonate, or polyolefins, such as polyethylene and polypropylene, may be blended therewith.

The term "polyarylene polyether polysulfone" as used herein refers to a polyarylene compound in which the arylene unit is positioned, at random or regularly, along with the ether and sulfone bonds. Examples are those compounds comprising the repeating units represented by the formulae (1) to (16) shown below. In particular, those compounds comprising the repeating units represented by the formula (1) or (6) are preferred.

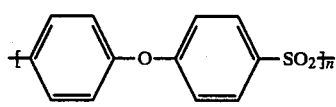

(1)

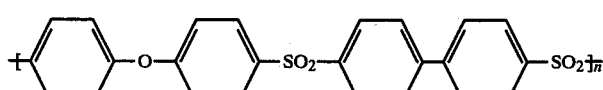

(2)

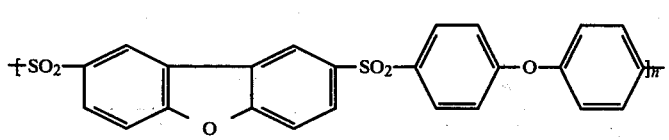

(3)

-continued
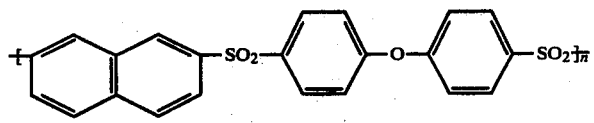 (4)
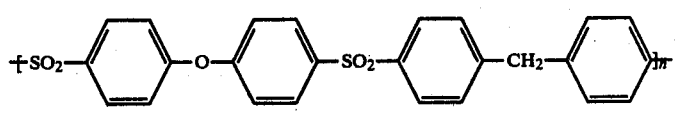 (5)
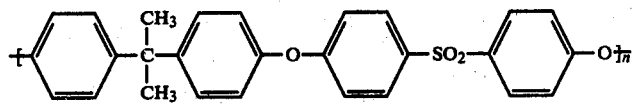 (6)
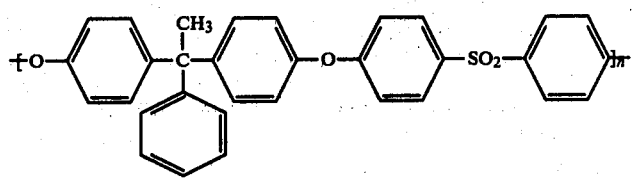 (7)
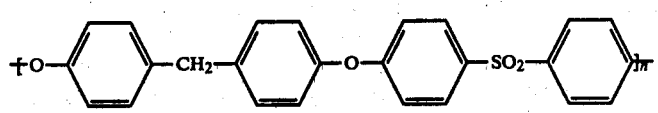 (8)
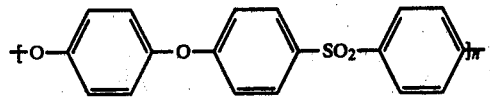 (9)
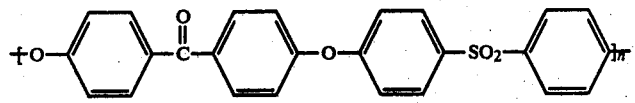 (10)
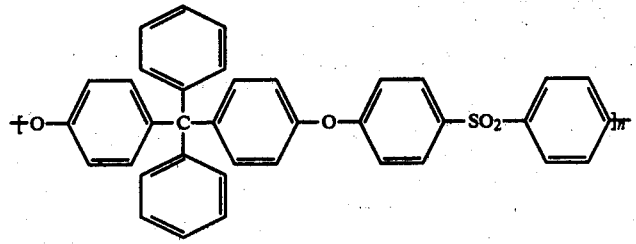 (11)
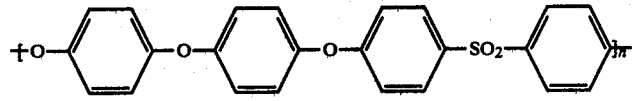 (12)
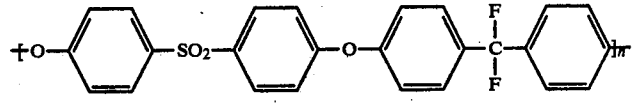 (13)
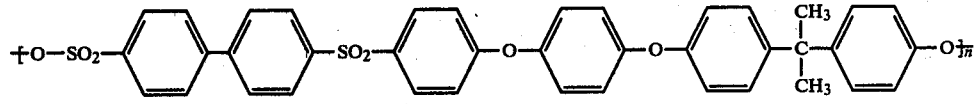 (14)
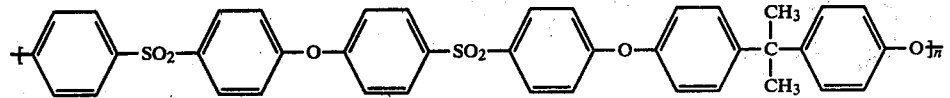 (15)

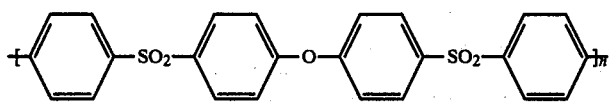
(16)

The term "polyarylate" as used herein refers to aromatic polyesters (hereinafter referred to as "APC") which are synthesized from dihydric phenols or their functional derivatives, and aromatic dibasic acids or their functional derivatives; and aromatic polyester (hereinafter referred to as "APE") which are synthesized from dihydric phenols or their functional derivatives, aromatic dibasic acids or their functional derivatives, and p-oxybenzoic acid or its functional derivatives.

Depending on ultimate use of the film, inorganic fillers and pigments for coloration, e.g., calcium carbonate, fine silicate, talc, basic magnesium carbonate, alumina, hydrated alumina, barium sulfate, calcium sulfate, mica powder, zinc white, titanium oxide, and carbon black, may be added.

In rolling the thermoplastic polyether ether ketone film in accordance with the method of the invention, it is necessary to apply thereto a backward tension of at least 80 kg/cm$^2$ at the inlet side of the pressure rolls. The term "backward tension" as used herein refers to a force acting to the opposite direction of that in which the film proceeds, which is also called a feed tension. When the backward tension is less than 80 kg/cm$^2$, the neutral point (maximum pressure point) in the pressure rolls moves toward the inlet side of the pressure rolls. This readily leads to poor thrust and impairs stable orientation processing.

With regard to the rolling temperature, the pressure rolls can be set at any desired point within a broad temperature range of from 80° C. to 320° C. This is one of the features of the invention as compared to the conventional stretching method. In accordance with the conventional stretching method, although the stretching can be performed within a very narrow temperature range around 280° C., film-cutting often occurs, and it is not possible to continuously perform the orientation on an industrial scale. On the other hand, the method of the invention permits stable and continuous orientation within a very broad temperature range of from 80° C. to 320° C. on an industrial scale.

When the rolling temperature is lower than the above specified lower limit (80° C.), the desired rolling down ratio cannot be obtained unless a number of pressure roll groups are used and the pressure applied between the rolls is significantly increased. This causes various problems in the design or construction of molding apparatus and needs expensive equipment.

On the other hand, when the rolling temperature is higher than the above specified upper limit (320° C.), the thermoplastic polyether ether ketone film sticks onto the pressure roll, and it becomes impossible to obtain the desired orientation effect.

The linear pressure to be applied to the film should be at least 100 kg/cm. At linear pressure lower than 100 kg/cm, sufficient orientation cannot be attained.

In order to reduce the friction coefficient between the pressure rolls and the film in rolling in accordance with the method of the invention, a suitable liquid lubricant may be applied to a point at which the pressure is applied onto the film, and the film may be preliminarily heated in a heating method such as infrared ray heating, far infrared ray heating, high frequency heating, hot air heating, steam heating, and bath heating.

The thus obtained thermoplastic polyether ether ketone film having high mechanical strength has several advantages over a polyimide film having similar heat resistance. For example, a typical polyimide film sold under a trade name of "Kapton" by du Pont de Nemours & Co., Inc., U.S.A. has various defects in respect of quality, e.g., resistance to alkalis and resistance to hot water are poor, and in heat-sealing the polyimide film, it is necessary to laminate another thermoplastic resin film thereon since the polyimide film is thermosetting and cannot be sealed as such, and furthermore, it is expensive. On the other hand, the thermoplastic polyether ether ketone film having high mechanical strength which is produced in accordance with the method of the invention has excellent mechanical properties, resistance to alkalis and resistance to hot water, and furthermore, it can be heat sealed since it is thermoplastic. Moreover, the film of the invention is advantageous in production cost over the polyimide film, and thus it can be expected to have usefulness on an industrial scale.

The following Examples and Comparative Examples are given to illustrate the invention in greater detail, but the present invention is not limited thereto.

EXAMPLE 1

A thermoplastic polyether ether ketone resin (non-reinforced grade, produced by Imperial Chemical Industries Limited) was extruded from a 400 mm wide T die using a 30 mm $\phi$ screw extruder to form a 100 $\mu$m thick film.

The raw film thus formed was calendered by means of a pair of pressure rolls having a diameter of 260 mm and a face length of 700 mm under the condition shown in the table below to obtain a rolled film having a good outer appearance. The relation among the rolling condition, rolling down ratio and tensile strength as a typical physical property is also shown in the table below.

COMPARATIVE EXAMPLE 1

The same raw film as formed in Example 1 was rolled by means of a pair of pressure rolls having a diameter of 260 mm and a face length of 700 mm under the condition shown in the table below, falling outside the rolling condition range of the invention. The relation among the rolling condition, rolling down ratio and tensile strength is also shown in the table below.

COMPARATIVE EXAMPLE 2

The same raw film as formed in Example 1 was stretched by means of a group of rolls having different haul-off speed and maintained at 280° C. Film-cutting occurred frequently, and the stretching could not be performed continuously.

EXAMPLE 2

80% by weight of a thermoplastic polyether ether ketone resin (non-reinforced grade, produced by Imperial Chemical Industries Limited) and 20% by weight of a polyethersulfone resin (200 P, produced by Imperial Chemical Industries Limited) were blended, and a mixture was granulated, followed by extruding from a 400 mm wide T die using a screw extruder having a diameter of 30 mm to form a 300 μm thick sheet.

The raw sheet thus formed was calendered by means of a pair of pressure rolls having a diameter of 260 mm and a face length of 700 mm under the condition shown in the table below to obtain a rolled sheet. The relation among the rolling condition, rolling down ratio and tensile strength is shown in the table below.

COMPARATIVE EXAMPLE 3

The same raw sheet as formed in Example 2 was rolled by means of a pair of pressure rolls having a diameter of 260 mm and a face length of 700 mm under the condition shown in the table below, falling outside the rolling condition range of the invention. The relation among the rolling condition, rolling down ratio and tensile strength is also shown in the table below.

While the invention has been described in detail and with reference to specific embodiments thereof, it will be apparent to one skilled in the art that various changes and modifications can be made therein without departing from the spirit and scope thereof.

What is claimed is:

1. A method for the orientation of a film or sheet consisting essentially of a crystalline thermoplastic polyether ether ketone containing therein a repeating unit represented by the formula:

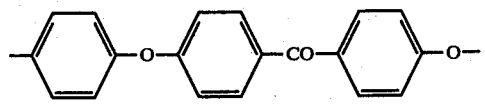

singly or in combination with one or more different repeating units, which comprises rolling the film or sheet of crystalline thermoplastic polyether ether ketone at a linear pressure of at least 100 kg/cm by the use of at least one pair of pressure rolls maintained within a temperature range of from 80° C. to 320° C. while applying a backward tension of at least 80 kg/cm$^2$.

TABLE

| | Type of Resin | Thickness (μm) | Calendering Conditions | | | | Calendering Ratio (times) | Tensile Strength** (kg/cm$^2$) | Observation during Rolling |
| --- | --- | --- | --- | --- | --- | --- | --- | --- | --- |
| | | | Temperature (°C.) | Lubricant | Linear Pressure (kg/cm) | Backward Tension (kg/cm$^2$) | | | |
| Example 1 | Polyether Ether Ketone | 100 | — | — | — | — | — | 850/800 | — |
| | | 28 | 280 | none | 200 | 150 | 3.5 | 3100/820 | good rolling properties |
| | | 30 | 100 | PEG* #200 | 180 | 120 | 3.3 | 2900/800 | good rolling properties |
| Comparative Example 1 | Polyether Ether Ketone | — | 330 | none | 200 | 150 | — | — | sticking |
| | | 90 | 70 | PEG #200 | 80 | 150 | 1.1 | 900/850 | — |
| | | 80 | 280 | none | 200 | 70 | 1.3 | 950/820 | — |
| Example 2 | Polyether Ether Ketone (80 wt %)/ Polyethersulfone (20 wt %) | 300 | — | — | — | — | — | 880/850 | — |
| | | 90 | 200 | none | 250 | 120 | 3.3 | 2800/830 | good rolling properties |
| | | 80 | 150 | PEG #200 | 200 | 120 | 3.6 | 3100/850 | good rolling properties |
| Comparative Example 3 | Polyether Ether Ketone (80 wt %)/ Polyethersulfone (20 wt %) | 250 | 200 | none | 50 | 120 | 1.2 | 1000/850 | — |
| | | 270 | 150 | PEG #200 | 200 | 30 | 1.1 | 900/850 | jetting |
| | | 210 | 30 | PEG #200 | 250 | 150 | 1.4 | 1200/880 | — |

*PEG = Polyethylene glycol
**Tensile strength (in a longitudinal direction/in a transverse direction)

* * * * *